United States Patent
Cao et al.

(10) Patent No.: US 10,705,935 B2
(45) Date of Patent: Jul. 7, 2020

(54) GENERATING JOB ALERT

(71) Applicant: INTERNATIONAL BUSINESS MACHINES CORPORATION, Armonk, NY (US)

(72) Inventors: Zhao Cao, Beijing (CN); Peng Li, Beijing (CN); Jun Ma, Beijing (CN); Ju Wei Shi, Beijing (CN); Bing Jiang Sun, Beijing (CN); Chen Wang, Beijing (CN); Lin Hao Xu, Beijing (CN); Chang Hai Yan, Beijing (CN); Xiao Ning Zhang, Beijing (CN); Jia Zou, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 68 days.

(21) Appl. No.: 14/863,661

(22) Filed: Sep. 24, 2015

(65) Prior Publication Data

US 2016/0110224 A1    Apr. 21, 2016

(30) Foreign Application Priority Data

Sep. 25, 2014    (CN) .......................... 2014 1 0499398

(51) Int. Cl.
*G06F 9/46*    (2006.01)
*G06F 11/30*    (2006.01)
(Continued)

(52) U.S. Cl.
CPC .......... *G06F 11/3003* (2013.01); *G06F 11/00* (2013.01); *G06F 11/302* (2013.01);
(Continued)

(58) Field of Classification Search
CPC ......... G06F 9/52; G06F 11/3003; G06F 11/00
See application file for complete search history.

(56) References Cited

U.S. PATENT DOCUMENTS 6,502,148 B1 *  12/2002  Krum ...................... H04L 67/10
                                                           709/208
8,024,211 B1 *  9/2011  Cohen ..................... G06Q 10/06
                                                           705/7.14
(Continued)

FOREIGN PATENT DOCUMENTS

CN    101697141 A    4/2010
CN    103324534 A    9/2013
CN    103605662 A    2/2014

OTHER PUBLICATIONS

Buchade, Amar et al., MapReduce Based Log File Analysis for System Threats and Problem Identification, Advance Computing Conference (IACC), 2013 IEEE 3rd International, Feb. 22-23, 2013, 831-835, IEEE, Ghaziabad, India. http://ieeexplore.ieee.org/xpl/articleDetails.jsp?tp=&arnumber=6514334&queryText%3DGenerate+Disk+Alerts+for+MapReduce+jobs.

(Continued)

*Primary Examiner* — Wissam Rashid
(74) *Attorney, Agent, or Firm* — Tutunjian & Bitetto, P.C.; Abdy Raissinia (57) ABSTRACT

A method and system for generating a job alert. According to embodiments of the present invention, before a target job is processed, a characteristic of input and output of the target job in at least one stage is determined through analyzing a historical job, and a resource overhead associated with the processing of the target job is calculated based on the characteristic of input and output. Then, an alert for the target job is generated in response to the resource overhead exceeding a predetermined threshold. In such manner, an alert for the target job can be proactively generated before the resource overhead problem occurs, so as to enable an administrator or developer to discover a fault in advance and adopt measures actively to avoid loss and damage to the (Continued)

intermediate results or output data when the target job is processed.

18 Claims, 2 Drawing Sheets

(51) Int. Cl.
*G06F 11/00* (2006.01)
*G06F 11/34* (2006.01)

(52) U.S. Cl.
CPC ...... *G06F 11/3404* (2013.01); *G06F 11/3442* (2013.01); *G06F 11/3485* (2013.01); *G06F 2201/81* (2013.01); *G06F 2201/865* (2013.01)

(56) References Cited

U.S. PATENT DOCUMENTS

| | | | |
|---|---|---|---|
| 8,296,419 B1 | 10/2012 | Khanna et al. | |
| 9,495,222 B1* | 11/2016 | Jackson | G06F 9/52 |
| 2004/0111715 A1* | 6/2004 | Stone | G06F 8/45 717/148 |
| 2009/0077235 A1 | 3/2009 | Podila | |
| 2009/0313230 A1* | 12/2009 | Shimizu | G06F 11/3404 |
| 2013/0159502 A1* | 6/2013 | Thompson | H04L 63/0815 709/224 |
| 2013/0204948 A1 | 8/2013 | Zeyliger et al. | |
| 2013/0254196 A1 | 9/2013 | Babu et al. | |
| 2013/0282788 A1 | 10/2013 | Hylick et al. | |
| 2013/0346988 A1 | 12/2013 | Bruno et al. | |
| 2014/0215178 A1 | 7/2014 | Li et al. | |
| 2016/0335731 A1* | 11/2016 | Hall | G06Q 50/163 |
| 2017/0302586 A1* | 10/2017 | Suchter | G06F 9/5038 |

OTHER PUBLICATIONS

Campbell, Jason D. et al., Understanding and Improving the Diagnostic Workflow of MapReduce Users, CHIMIT '11 Proceedings of the 5th ACM Symposium on Computer Human Interaction for Management of Information Technology, Dec. 4, 2011, ACM, Boston, MA, USA. http://dl.acm.org/citation.cfm?id=2076445.

Configuring Monitoring Settings, 2014. http://www.cloudera.com/content/cloudera/en/documentation/archives/cloudera-manager-4/v4-5-3/Cloudera-Manager-Enterprise-Edition-User-Guide/cmeeug_topic_4_12.html.

Dudko, Roman et al., Effective Failure Prediction in Hadoop Clusters, Mar. 2012. http://www.jontedesco.net/wp-content/uploads/2013/01/Effective-Visualization-for-Hadoop-Clusters.pptx.pdf.

Dudko, Roman et al., Theius: A Streaming Visualization Suite for Hadoop Clusters, Cloud Engineering (IC2E), 2013 IEEE International Conference, Mar. 25-27, 2013, 177-182, IEEE, Redwood City, CA. http://ieeexplore.ieee.org/xpl/articleDetails.jsp?arnumber=6529282&tag=1.

International Office Action Issued in Chinese Application No: 2014104993988.8 dated Apr. 27, 2018, 6 pages.

* cited by examiner

GENERATING JOB ALERT

CROSS-REFERENCE TO RELATED APPLICATION

This application claims the benefit of priority from Chinese Patent Application 201410499398.8, filed Sep. 25, 2014, the contents of which are incorporated herein by reference.

FIELD OF THE INVENTION

Embodiments of the present invention generally relate to the field of computer, and more specifically, to a method and system for generating a job alert.

BACKGROUND

A job processing framework supporting concurrent computation is widely used since it can process large data set in a timely and efficient manner. In such job processing framework, one job is split into a plurality of tasks implemented at one or more stages. Tasks in each stage can be assigned to different computing nodes for parallel run, thereby promoting job processing efficiency. By way of example, a MapReduce framework is a commonly used parallel job processing framework at the present and has been used in fields such as web access log analysis, document clustering, machine learning, data statistics, and statistics-based machine translation.

When a job is processed in parallel, support is usually needed from some computing or storage resources. For example, when a job is implemented at multiple stages, output of the previous stage (also called "intermediate results") is generally written into local disks of computing nodes so that it is read as input for tasks in the next stage. When the job processing is finished, the output data of the job can be stored in a storage system, such as a distributed file system. For the job processing related to a large data set, whether the parallel processing system is capable of supporting resource overhead of the job is the concern for a system administrator and a job developer. Job alert can be used to indicate problems of system resource overhead.

Among known solutions for generating a job alert, when a job is submitted, a job processing system will directly process the job. During job processing, if the storage quantity of the intermediate results generated is larger than the available storage space of the local disk, or the storage quantity of the final output data of the job is larger than the available storage space of the storage system, an alert is generated by the job processing system. However, if an alert is generated under the circumstances that severe problems such as insufficient disk space or storage system space have already occurred, it can cause loss and damage to intermediate tasks or output data of the job. In such case, the system administrator or the job developer cannot proactively avoid resource overhead problems like insufficient storage space and has to passively repair the fault after knowing the occurrence of resource overhead problem from the alert, so that the processing system fault cannot be dealt with timely. Furthermore, if the amount of intermediate results generated in a computing node is too large, it also poses a great challenge to the I/O resources and computing resources (e.g., CPU processing) of the computing node.

SUMMARY OF THE INVENTION

In light of the above and other potential problems, a prospective solution for the job alert is needed in the field.

The present invention provides a method for generating a job alert. The method includes determining a characteristic of input and output of a target job in at least one stage through analyzing a historical job, wherein the target job is to be processed in parallel in the at least one stage; calculating a resource overhead associated with processing of the target job based on the characteristic of input and output; and generating an alert for the target job in response to the resource overhead exceeding a predetermined threshold.

The present invention also provides a system for generating a job alert. The system includes: a characteristic determining unit configured to determine a characteristic of input and output of a target job in at least one stage through analyzing a historical job, wherein the target job is to be processed in parallel in the at least one the stage; a resource overhead calculating unit configured to calculate a resource overhead associated with processing of the target job based on the characteristic of input and output; and an alert generating unit configured to generate an alert for the target job in response to the resource overhead exceeding a predetermined threshold.

Other features and advantages of the present invention will become more comprehensible through the description below.

BRIEF DESCRIPTION OF THE DRAWINGS

Through the more detailed description of example embodiments of the present disclosure in the accompanying drawings, the above and other objects, features and advantages of the present disclosure will become more apparent. The same reference generally refers to the same element in the example embodiments of the present disclosure.

DETAILED DESCRIPTION OF THE PREFERRED EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
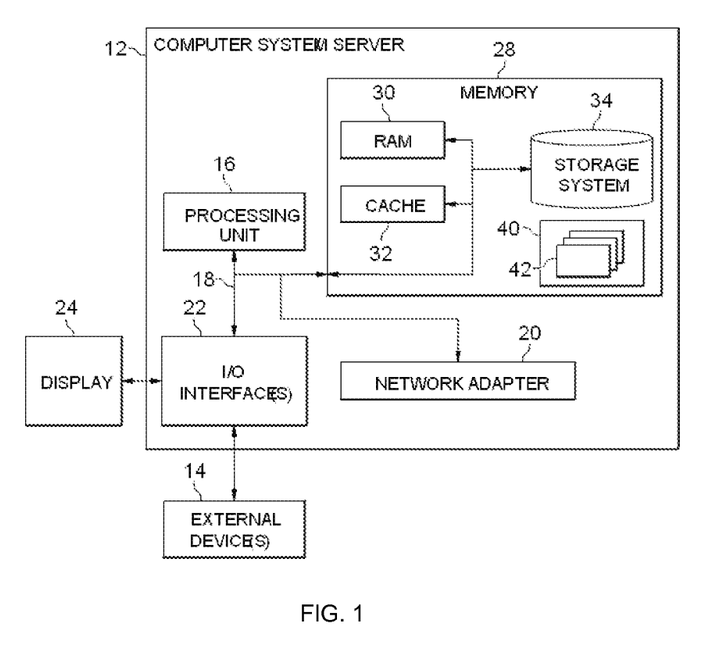
FIG. 1 shows a block diagram of an exemplary computer system/server which is applicable to implement embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, at least one processor or processing unit 16, a system memory 28, and a bus 18 that couples various system components including system memory 28 to processor 16.

Bus 18 represents at least one type of bus structure, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic media (e.g., a "floppy disk"), and an optical disk drive for reading from or writing to a removable, non-volatile optical disk drive such as a CD-ROM, DVD-ROM or other optical media can be provided. In such instances, each can be connected to bus 18 by at least one data media interface. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, at least one application program, other program modules, and program data. Each of the operating system, at least one application program, other program modules, and program data or some combination thereof, can include an implementation of a networking environment. Program modules 42 generally carry out the functions and/or methodologies of embodiments of the invention as described herein.

Computer system/server 12 can also communicate with at least one external devices 14 such as a keyboard, a pointing device, a display 24 etc.; at least one device that enables a user to interact with computer system/server 12; and/or any devices (e.g., network card, modem, etc.) that enable computer system/server 12 to communicate with at least one other computing device. Such communication can occur via Input/Output (I/O) interfaces 22. Still yet, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 19. It should be understood that although not shown, other hardware and/or software components could be used in conjunction with computer system/server 12. Examples, include, but are not limited to: microcode, device drivers, redundant processing units, external disk drive arrays, RAID systems, tape drivers, and data archival storage systems, etc.

In the description of exemplary embodiments, the term "include" and other similar expressions indicate an inclusion in an open manner, i.e., "include, but are not limited to". The term "based on" represents "based on at least in part". The term "an embodiment" or "the embodiment" means "at least one embodiment". The term "job" means any computing/processing tasks, e.g., data analysis, document clustering, machine learning, data statistics, data mining, etc. The term "target job" refers to the job to be processed; and the term "historical job" refers to the job that has already been processed.

Hereinafter, embodiments of the present invention will be described in detail. Through the description below, it will be understood that the core and creative idea of the present invention lies in that: a historical job(s) is used to determine a characteristic of input and output of the target job and thereby a resource overhead of the target job is calculated. Therefore, before the target job is processed, an alert for the target job can be generated based on the calculated resource overhead. In such manner, an alert for the target job can be proactively generated before the resource overhead problem occurs, so as to enable an administrator or the developer to discover a fault in advance and adopt measures actively to avoid loss and damage to the intermediate results or output data when the target job is processed.

It is to be understood through the following description that according to embodiments of the present invention, a historical job(s) is used to determine a characteristic of input and output of the target job and thereby a resource overhead of the target job can be calculated. Therefore, before the target job is processed, an alert for the target job can be generated based on the calculated resource overhead. In such manner, an alert for the target job can be proactively generated before the resource overhead problem occurs, so as to enable an administrator or the developer to discover a fault in advance and adopt measures actively to avoid loss and damage to the intermediate results or output data when the target job is processed.

Figure 2:
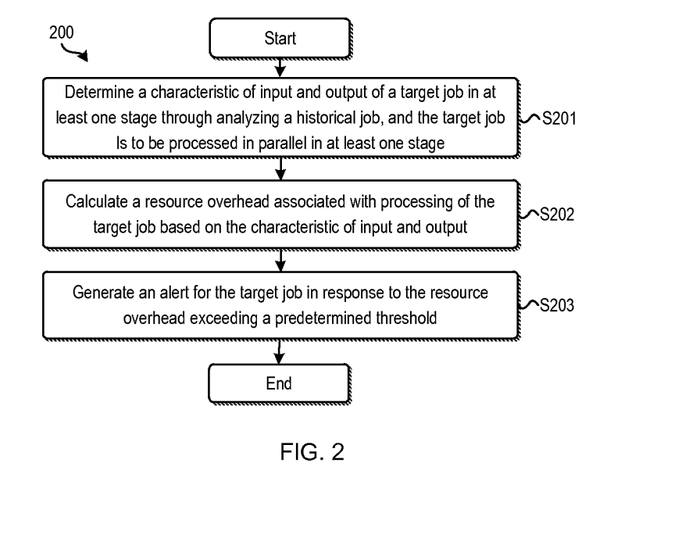
FIG. 2 shows a flow chart of a method for generating a job alert in accordance with an exemplary embodiment of the present invention.

Reference is now made to FIG. 2, which shows a flowchart of a method 200 for generating a job alert in accordance with an embodiment of the present invention. At step S201, a characteristic of the input and output of the target job in at least one stage is determined through analyzing a historical job.

As described above, the target job refers to the job to be processed and it will be processed in parallel in at least one stage. Likewise, a historical job refers to the job that has been processed, e.g., a job(s) recorded in a log(s) of a job processing system, such as the Hadoop system. The number of historical jobs can be at least one, which is not limited in embodiments of the present invention. In some embodiments, a historical job can be obtained from a portion of input data of the target job that has been processed. For example, in one embodiment, if no historical job related to the target job is recorded in the system, the input data of the target job can be sampling, and the part of sampled input data can be processed according to the processing logic of the target job, so as to obtain the historical job.

In the processing of the target job and/or historical jobs in each stage, a job can have at least one task. Such tasks can be assigned to at least one computing node for parallel processing. If one job includes two or more stages, the input of a task in the first stage can be input data provided by a user/developer, and the input of a task in an intermediate stage can be the output data of the task in the previous stage, and the output data of a task(s) in the final stage can be regarded as the final output of the job.

By way of example, jobs based on a MapReduce framework can be processed in two stages: a Map stage and a Reduce stage. The output data of a task in the Map stage (or a "Map task" for short) can be used as the input data of a task in the Reduce stage (or a "Reduce task" for short) and the output data of the Reduce tasks will be the final output data of the job.

Job processing can involve multiple kinds of resource, such as computing resource, storage resource, I/O resource, etc. Since each of the tasks of a job has its own input and output, the overhead of these resources generally relates to the input data and output data of the tasks. For example, if the output data in the intermediate stage (the input data of the next stage) is too large, it can cause problem such as insufficient space of the local disk, a slow read/write rate due to a large amount of read/write of the disk or a slow computing rate of the task in the next stage. Therefore, one purpose of embodiments of the present invention is to predict the characteristic of input and output of the target job based on the characteristic of input and output of the historical job(s), so as to proactively discover a fault in the job processing system and generate an alert accordingly.

In some embodiments, the historical jobs and the target job can have the same processing logic. If the characteristic of input and output of the target job are determined, then an association between the input data and the output data of the target job is determined based on the input data size and the output data size of historical jobs. For the sake of clarity, this association is called as a "first association", which can be used to indicate the characteristic of input and output of the target job. Since the historical jobs have the same processing logic as the target job, a ratio of input to output of the target job can be similar to that of the historical jobs. Therefore, the determined first association can be subsequently used to determine the output data size of the target job. Particularly, in one embodiment, the first association can indicate a fixed ratio of the input to output. In another embodiment, the first association can indicate a function of the input and output. The first association can indicate the characteristic of input and output of the target job in other manners, which is not limited in embodiments of the present invention.

In the above embodiments, the first association is a characteristic of the input and output considered from an overall perspective of the target job, regardless that the target job has only one stage or a plurality of stages. In embodiments where the target job has a plurality of stages, the target job can have an intermediate task(s) in one of the plurality of stages (which can also be called as an "intermediate stage"). Similarly, a historical job can also have an intermediate task(s) in a given intermediate stage, e.g., called as a "historical intermediate task". In some cases, the historical intermediate tasks of the historical jobs can have the same processing logic with the intermediate task of the target job. At this time, the ratio of input to output of the intermediate task of the target job can be similar to that of the historical intermediate task. Therefore, if the characteristic of the input and output of the target job are determined, then an association between the input data and the output data of the intermediate task of the target job is also determined based on the input data size and the output data size of the historical intermediate task. For the sake of clarity, this association is called as a "second association".

In particular, an intermediate stage can be any of the stages of the target job, including the first stage of the target job. In some cases, the intermediate stage can not be the last stage of the target job, because the final output of the task in the final stage is usually stored in a corresponding file system, rather than in the local storage of the computing node. For example, for a target job based on the MapReduce framework, the intermediate stage can be the Map stage since the Map stage is followed by the Reduce stage, which is the final stage of the job.

In one embodiment, the historical intermediate tasks of the historical jobs are not necessary to be in a stage corresponding to the intermediate tasks of the target job, as long as the intermediate tasks have the same processing logic as the historical intermediate task. For example, it is possible that an intermediate task of the target job in its first stage possesses the same logic as a historical intermediate task of a historical job in its second stage. In another embodiment, the tasks of the target job and the historical jobs at other stages can or can not possess the same processing logic. For example, the historical jobs can also be jobs based on the MapReduce framework and a historical intermediate task can refer to a Map task. In this embodiment, the processing logic of the Map task of the target job and the historical job is the same, but the processing logic of their Reduce tasks can be the same or be different.

A historical job can have at least one historical intermediate task. In order to statistically determine the second association precisely, the input data size and the output data size of all of these historical intermediate tasks are considered as long as they have the same logical as the processing of the intermediate task(s) of the target job. In one embodiment, the second association can refer to a fixed ratio of the input to output. In another embodiment, it can refer to a function of the input and output. The second association can indicate the characteristic of input and output of the target job in the intermediate stage in other manners and the embodiments of the present invention are not restricted in this regard.

As described above, the output data generated at the intermediate stage of job processing can be stored temporarily for subsequent use. In some embodiments, the output data of each of the intermediate tasks can usually be stored in a form of at least one record. Therefore, in order to characterize the characteristic of input and output of the target job in the intermediate stage, in some embodiments, an association between the input data and an output record number of intermediate tasks of the target job is determined based on the input data size and an output record number of the historical intermediate task(s). For the sake of clarity, this association is called as a "third association". Particularly, in one embodiment, the third association can refer to a fixed ratio of the input data to the output record. In another embodiment, the third association can refer to a function of the input data and the output record. The third association can indicate the characteristic of the input data and the output record of the target job in the intermediate stage in other manners, which is not limited in embodiments of the present invention.

In some embodiments, the input data of historical intermediate tasks can be stored in files, in which the input data can be stored in rows or columns. In such instance, the corresponding third association is determined based on the input data in at least one of the rows or columns of the file and the corresponding output record number. Likewise, the determined third association can be a fixed ratio of the input data to the output record number or a function of the input data and the output record number.

It is noted that if the target job has multiple intermediate stages, a corresponding second association and third association can be determined for the intermediate task(s) in the same stage.

As discussed above, for the target job, the first association, the second association, and the third association characterizing the characteristics of the input and output of the target job in each stage can be determined based on the historical jobs. In some embodiments, one or some of the first association, the second association, and the third association can be determined for the target job. In some other embodiments, other characteristics of the input and output rather than the three associations can also be determined. The determined characteristics of the input and output can be used to predict the resource overhead associated with the processing of the target job.

Refer back to FIG. 2, where the resource overhead associated with the processing of the target job is calculated based on the properties of the input and output at step S202. As discussed above, the resource overhead associated with the processing of the target job, e.g., the overhead of computing resource, storage resource and I/O resource is related to the input and output of the target job in each stage. Therefore, in the calculation of the resource overhead, one or some of the first association, second association, and third association calculated above can be considered, so as to determine the resource overhead in the corresponding stages.

At step S203, an alert for the target job is generated in response to the resource overhead exceeding a predetermined threshold. For example, if the storage resource overhead determined at step S202 is higher than the available storage resource overhead, a corresponding alert is generated. Alternatively or additionally, in one embodiment, if the overhead of read/write resource determined at step S202 exceeds a predetermined read/write quantity, a corresponding alert can be generated. In one embodiment, the generated alert can only indicate that a fault will occur in the system when the target job is processed. In another embodiment, an alert can also specifically indicate the fault to the user, e.g., indicate to the user that the storage resources are insufficient or the read/write quantity is too large.

The calculation of the resource overhead associated with the processing of the target job and the generation of the corresponding alert will be described in detail below. The resource overhead of the target job is related to the input data of the target job. Therefore, in some embodiments, a property of the input data of the target job is obtained before the calculation of the resource overhead. The input data property can include at least one of the followings: input data size, data distribution, and the block size. Usually when the target job is extracted, the input data of the target job, together with the input data property, is submitted to the corresponding storage system, such as a distributed file system. Thus, the input data property can be directly obtained from the storage system.

In some embodiments, the input data size of the target job can be obtained only. Then, based on the first association and the input data size, the output data size of the target job after at least one stage is determined.

For example, if the first association indicates the ratio of input to output of the target job is 2:1 and the input data size of the target job is 1 GB, it can be determined that the output data size is 0.5 GB after the target job has been processed in parallel in at least one stage. It can be predicted based on the first association that the output data of the target job will consume 0.5 GB of the storage space after the processing of the target job has been finished.

In one embodiment, when the target job is processed in the final stage (in the first stage if the target job is processed only in one stage), there can be at least one task in the stage and the output data of the target job can consist of the output data of the different tasks.

In some embodiments, the output data of the target job can be stored in the corresponding memory. In the generation of alert, an alert for the target job can be generated in response to the output data of the target job after the at least one stage exceeding a predetermined storage threshold for the corresponding memory. In one embodiment, the predetermined storage threshold can be the available storage size of the corresponding memory, which can be a memory located in a distributed file system, such as HDFS (Hadoop distributed file system). Therefore, the predetermined storage threshold can be the available storage size of a storage node cluster of the distributed file system. In other embodiments, the predetermined storage threshold can be preset and can be less than the available storage size of the corresponding memory.

According to the generated alert, the system administrator or supervisor can expand the storage space of the corresponding storage node cluster to avoid the occurrence of a fault when the target job is processed. The system administrator or supervisor can also adjust the storage location of the output data of the target job to reduce the use of the storage nodes which have less available storage space. Additionally or alternatively, since the output data of the target job can be compressed first and then stored, a compression ratio of the output result can be adjusted according to the generated alert to reduce the storage space needed for the output data of the target job.

The calculation of the resource overhead and the generation of an alert with respect to the second association are discussed below. In addition to the resource overhead of the final output of the target job, the resource overhead of the target job in the intermediate stage(s) can also be considered. Since the target job can be divided into at least one intermediate task (such as, Map tasks) at an intermediate stage, the input data of the target job will be divided to the corresponding intermediate tasks for processing. In some embodiments, for each of the intermediate tasks of the target job, the input data size associated with the intermediate task is determined based on a property of the input data of the target job. After the target job has been submitted, as mentioned above, the job processing system can obtain the input data property of the target job, such as the size, distribution (e.g., the number of the files and the size of each file) and the block size of the input data. Then, based on the input data property of the target job, the number of intermediate tasks to be classified from the target job can be determined. According to the input data sizes and the determined number of intermediate tasks, the input data size associated with each of the intermediate task can be determined. The output data size of intermediate tasks can be determined on the basis of the second association and the input data sizes associated with the intermediate tasks.

By way of example, the input data size of the target job is 1 GB and the determined second association indicates that the ratio of input to output is 1:3 for each of the intermediate tasks (i.e., Map task). For a MapReduce target job, based on its input data property, the target job can be divided into four Map tasks at the Map stage: Map 1, Map 2, Map 3 and Map 4, and the input data size of each Map task is 0.25 GB. According to the second association of 1:3 and the input data size of each Map task, the output data size of each Map task can be determined as 0.75 GB.

In some embodiments, in the generation of alert, an alert for the target job can be generated in response to the output data size of the intermediate task exceeding a predetermined storage threshold for the corresponding memory.

When the target job has a plurality of intermediate tasks, the plurality of intermediate tasks are usually assigned to at least one computing node for execution in accordance with a predetermined strategy, and their output data can be stored in the local disk of the computing nodes. Therefore, whether an alert is generated can be determined for the local disk of each of the computing nodes respectively. In one embodiment, the number of intermediate tasks assigned can be determined for a computing node, and then the output data size associated with the computing node can be determined based on the output data size of each intermediate task and the number of the assigned intermediate tasks. In one embodiment, if the output data size is larger than the available storage space of the computing node, an alert is generated. In another embodiment, if the computing node has a plurality of magnetic disks, the available magnetic disk storage space of the magnetic disk used for storing corresponding output data is determined. If the corresponding output data is larger than the available magnetic disk storage space, an alert is then generated.

By way of example, assuming that the target job has four Map tasks, Map 1, Map 2, Map 3, and Map 4, Map 1 and Map 2 are to be assigned to Computing Node 1 for execution, and Map 3 and Map 4 are to be assigned to Computing Node 2 for execution. For Computing Node 1, the total output data of Map tasks, Map 1 and Map 2, is 1.5 GB. If the current available storage space of Computing Node 1 is 1.0 GB, an alert is generated to indicate the insufficient magnetic disk space of Computing Node 1. For Computing Node 2, the total output data of Map tasks, Map 3 and Map 4, is 1.5 GB. If the current available storage space of Computing Node 2 is 3.0 GB, then no alert will be generated for Computing Node 2.

In some other embodiments, in the generation of alert, an alert for the target job is generated in response to the output data size of the intermediate task exceeding a predetermined threshold. Since the size of the output data of the intermediate task will impact the processing speed of the intermediate task processing and the processing speed of the subsequent tasks that utilize the output data as input data, whether an alert is generated can further be determined based on the output data size of the intermediate task. For example, if the output data size of the intermediate task exceeds the predetermined threshold 1.0 GB, an alert is generated. Alternatively or additionally, whether an alert is generated can be determined on the basis of the output data size of the intermediate task and the computing resource (e.g., CPU processing resources) of the computing node that processes the intermediate task.

According to the alerts generated for different computing nodes, the system administrator or supervisor can expand the magnetic disk storage of the corresponding computing node to avoid a fault occurring when the target job is processed. Furthermore, the system administrator or supervisor can also adjust the number of intermediate tasks and the task assignment to the computing node when the target job is processed subsequently, in order to reduce the amount of intermediate results generated by the computing node with less magnetic disk storage resources or less computing resources.

The calculation of the resource overhead and the generation of an alert with respect to the third association will be discussed below. The output data of each intermediate task can generally be stored in a format of at least one record. In order to store the output record into the disk, each output record is first written into a buffer, then read from the buffer and written into the storage disk. Since the buffer size is limited, if the number of the output records generated by intermediate tasks of the target job is too large, it can result in buffer spill and further lead to more read/write operations. The occupation of I/O resources caused by read/write operations can decrease the processing speed of the system. Besides, in addition to the total size of the output records of each intermediate task (i.e., the size of output data), buffer spill is also related to the number of the output records, since each output record in the buffer is assigned with metadata. For example, in some systems, each output record has a respective 16-byte metadata. The larger the number of output records of each intermediate task is, the larger the buffer of metadata is.

Based on the above discussion, it can be seen that the read/write quantity of the target job in the intermediate stage is related to the number of output records of the intermediate task. In some embodiments, in order to predict read/write quantity in the intermediate stage, not only the third association related to the output record number which is determined based on the historical jobs, but also the second association related to the input and output of the intermediate task is used. Firstly, as in the above description regarding the second association, for each intermediate task of the target job, the input data size and output data size related to the intermediate task are determined based on the second association and the input data property of the target job. Then, on the basis of the third association and the input data size related to the intermediate task, the output record number of the intermediate task is determined. The read/write quantity corresponding to storing of the output data of the intermediate task is determined based on the output record number of the intermediate task and the output data size of the intermediate task.

The third association corresponds to an association between the input data and the output record number of the intermediate task of the target job. In determination of the output record number of the intermediate task, if the third association indicates that the ratio of the input data to the output record number of the intermediate task is 12:4 (wherein the input data is in bytes) for example, and if the input data of one intermediate task is 120 bytes, the output record number of the intermediate task is 40. In some embodiments, the input data of intermediate task can be stored in the file and arranged in rows or columns. In such instance, for the input data in at least one of the rows or columns of the file, the corresponding output record number can be determined respectively based on the third association. Then, the total output number corresponding to the intermediate task will be calculated.

The output record number can be used to calculate the buffer amount associated with the metadata of the output records. Usually, the metadata size of each output record is fixed, such as 16 bytes. The buffering size related to metadata can be calculated based on the output record number and the buffering size of the metadata. In the buffer, the user or the system can configure a certain proportion of buffer to the metadata and another proportion of buffer to the output data of the intermediate task respectively. If the output data size of metadata or the intermediate task exceeds the corresponding buffer, a spill will occur. Buffer spill will cause re-read and re-write operations. Therefore, the percentage of metadata and output data in the buffer is related to the buffer spill and thus related to the read/write quantity.

In one embodiment, it can be determined that whether a spill occurred for the metadata size comparing to the preconfigured buffer size, and whether a spill occurred for the output data size of the intermediates task comparing to the corresponding buffer size. Then, the read/write quantity corresponding to storing of the output data of the intermediate task can be determined based on the times of spills.

In some embodiments, in the generation of alert, an alert for the target job is generated in response to the determined read/write quantity exceeding the predetermined read/write threshold. The configuration of read/write threshold can depend on the I/O port resource of the computing node allocated for processing the intermediate task. For the computing node having more available I/O port resource, the corresponding read/write threshold can be set as a large value, and for the computing node having less available I/O resource, the corresponding read/write threshold can be set as a small one.

An alert for read/write resources enables the system administrator or the developer of the target job to adjust the corresponding system parameters. For example, the administrator or the job developer can modify the ratios of metadata to output data of intermediate tasks in the buffer, so as to reduce the times of buffer spills and thus reduce the read/write quantity. The administrator or the job developer can also modify the output data size of each of the intermediate tasks (i.e., modify the number of intermediate tasks) to reduce the output data or the output record number of each intermediate task. In this way, the read/write quantity corresponding to storing of the output data of intermediate tasks can be reduced.

It is noted that the above method described with reference to FIG. 2 is to predict the resource overhead of the target job and generate an alert when the target job has not been processed or has only been partly processed.

The calculation of resource overhead and the generation of alert for a target job are discussed above. However, in the job processing system, a plurality of target jobs can be grouped into a workflow and these target jobs are repeated. Thus, for each target job of the workflow, the resource overhead can be calculated in the way described in the above embodiments. In one embodiment, an alert for each target job can be generated based on the determined resource overhead. In another embodiment, an alert can also be generated for a workflow based on the determined resource overhead.

Figure 3:
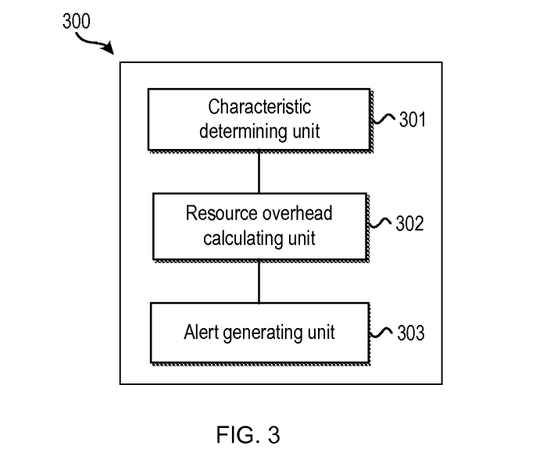
FIG. 3 shows a block diagram of a system for generating a job alert in accordance with an exemplary embodiment of the present invention.

FIG. 3 shows an exemplary block diagram of a system 300 for generating a job alert in accordance with an embodiment of the present invention. As shown in the figure, the system 300 includes a characteristic determining unit 301 configured to determine a characteristic of input and output of a target job in at least one stage through analyzing a historical job, wherein the target job is to be processed in parallel in the at least one stage; a resource overhead calculating unit 302 configured to calculate a resource overhead associated with the processing of the target job based on the characteristic of input and output; and an alert generating unit 303 configured to generate an alert for the target job in response to the resource overhead exceeding a predetermined threshold.

In some embodiments, the historical job is obtained based on a processed portion of input data of the target job having been processed. In other embodiments, the historical job has the same processing logic with the target job. In these embodiments, the characteristic determining unit 301 includes a first association determining unit configured to determine a first association between input data and output data of the target job based on an input data size and an output data size of the historical job.

In some embodiments, the resource overhead calculating unit 302 includes an input data obtaining unit configured to obtain an input data size of the target job; a first output data determining data configured to determine an output data size of the target job after the at least one stage based on the first association and the output data size of the target job. In some embodiments, the alert generating unit 303 is configured to generate the alert for the target job in response to the output data size of the target job after the at least one stage exceeding a predetermined storage threshold for a corresponding memory.

In some embodiments, the target job has an intermediate task, the historical job has a historical intermediate task, and the intermediate task has the same processing logic with the historical intermediate task; and in these embodiments, the characteristic determining unit 301 includes a second association determining unit configured to determine the second association between input data and output data of the intermediate task of the target job based on an input data size and an output data size of the historical intermediate task.

In some embodiments, the resource overhead calculating unit 302 includes an input data property obtaining unit configured to obtain an input data property of the target job, the property of the input data including at least one of an input data size, data distribution, or a block size of the input data, an intermediate input data determining unit configured to determine an input data size associated with the intermediate task of the target job based on the property of the input data, and an intermediate output data determining unit configured to determine an output data size of the intermediate task based on the second association and the input data size associated with the intermediate task.

In some embodiments, the alert generating unit 303 is configured to generate an alert for the target job in response to the output data size of the intermediate task exceeding a predetermined storage threshold for a corresponding memory.

In some embodiments, the characteristic determining unit 301 further includes a third association determining unit configured to determine a third association between the input data and an output record number of the intermediate task of the target job based on the input data size and an output record number of the historical intermediate task. In another embodiment, the resource overhead calculating unit 302 further includes an output record determining unit configured to determine an output record number of the intermediate task based on the third association and the input data size associated with the intermediate task, and a read/write quantity determining unit configured to determine read/write quantity corresponding to storing of the output data of the intermediate task based on the output record number of the intermediate task and the output data size of the intermediate task.

In some embodiments, the alert generating unit 303 is configured to generate the alert for the target job in response to the read/write quantity exceeding a predetermined read/write threshold.

It should be noted that for the sake of clarity, FIG. 3 does not show the optional units or subunits included in system 300. All features and operations described above are suitable for the system 300 respectively. Besides, the classification of units or subunits in the system 300 is not restricted but exemplary, with the purpose of describing its main function or operation on the logic level. The function of one unit can be implemented by a plurality of units, whereas, a plurality of units can also be implemented by one unit. The scope of the present invention is not limited in this regard. Besides, units included in the system 300 can be implemented in various manners, including software, hardware, firmware or any combinations of the foregoing. For example, in some embodiments, the system 300 can be implemented by software and/or firmware. Alternatively or additionally, the system 300 can be partly or fully implemented by hardware. For example, one or multiple units in the system 300 can be implemented as integrated circuit (IC) chip, application specific integrated circuit (ASIC), system on a chip (SOC), field programmable gate array (FPGA), etc. The scope of the present invention is not restricted in this regard.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming language, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer to other programmable data processing apparatus, create means for implementing the functions/acts specified in the flowchart and/or block diagram block, or blocks. These computer readable program instruction can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the functions/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagram in the Figures illustrate the architecture, functionality, and operation of possible implementations of systems, methods and computer program products according to various embodiments of the present invention. In this regard, each block in the flowchart or block diagrams can represent a module, segment, or portion of code, which includes at least one executable instruction for implementing the specified logical function(s). It should be noted that, in some alternative implementations, the functions noted in the block can occur out of order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, can be implemented by special purpose hardware-based systems that perform the specified functions or acts, or combinations of special purpose hardware and computer instructions.

The descriptions of the various embodiments of the present invention have been represented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a computer processing job alert, the method comprising:
   determining a historical job by sampling an input of a target job, wherein the target job has an intermediate task, the historical job has a historical intermediate task, and the intermediate task has the same processing logic with the historical intermediate task;
   determining a relationship of the input and an output of the target job in at least one stage of a plurality of stages through analyzing the historical job, wherein the target job is to be processed in parallel in the at least one stage, wherein determining a relationship of the input and the output of the target job in at least one stage through analyzing the historical job includes determining an association between an input data and an output data of the intermediate task of the target job based on an input data size and an output data size of the historical intermediate task;
   calculating a computing resource overhead prediction associated with the target job based on the relationship of input and output;
   generating a proactive alert for the target job in response to the resource overhead prediction exceeding a predetermined threshold indicating an insufficiency of system parameters for performing the target job; and
   processing the target job with adjusted system parameters to prevent exceeding a resource overhead.

2. The method according to claim 1, wherein the historical job is obtained based on a processed portion of input data of the target job.

3. The method according to claim 1, wherein the historical job has the same processing logic with the target job and wherein determining a characteristic of input and output of a target job in at least one stage through analyzing a historical job comprises:
   determining a second association between input data and output data of the target job based on an input data size and an output data size of the historical job.

4. The method according to claim 3, wherein calculating a computing resource overhead associated with processing of the target job based on the characteristic of input and output comprises:
   obtaining an input data size of the target job; and
   determining an output data size of the target job after the at least one stage based on the second association and the input data size of the target job.

5. The method according to claim 4, wherein generating an alert for the target job in response to the computing resource overhead exceeding a predetermined threshold comprises:
   generating the alert for the target job in response to the output data size of the target job after the at least one stage exceeding a predetermined storage threshold for a corresponding memory.

6. The method according to claim 1, wherein calculating a computing resource overhead associated with processing of the target job based on the characteristic of input and output comprises:
   obtaining a property of input data of the target job, the property of the input data including at least one of an input data size, data distribution, and a block size of the input data;
   determining an input data size associated with the intermediate task of the target job based on the property of the input data; and
   determining an output data size of the intermediate task based on the second association and the input data size associated with the intermediate task.

7. The method according to claim 6, wherein generating an alert for the target job in response to the computing resource overhead exceeding a predetermined threshold comprises:
   generating the alert for the target job in response to the output data size of the intermediate task exceeding a predetermined storage threshold for a corresponding memory.

8. The method according to claim 6, wherein determining a characteristic of input and output of the target job in at least one stage through analyzing a historical job further comprises: determining a third association between the input data and an output record number of the intermediate task of the target job based on the input data size and an output record number of the historical intermediate task; and
   wherein calculating a computing resource overhead associated with processing of the target job based on the characteristic of input and output further comprises:
   determining an output record number of the intermediate task based on the third association and the input data size associated with the intermediate task; and
   determining read/write quantity corresponding to storing of the output data of the intermediate task based on the output record number of the intermediate task and the output data size of the intermediate task.

9. The method according to claim 8, wherein generating an alert for the target job in response to the computing resource overhead exceeding a predetermined threshold comprises:
   generating the alert for the target job in response to the read/write quantity exceeding a predetermined read/write threshold.

10. A system for generating a computer processing job alert, the system comprising:
    a relationship determining unit configured to
       determine a historical job by sampling an input of a target job, wherein the target job has an intermediate task, the historical job has a historical intermediate task, and the intermediate task has the same processing logic with the historical intermediate task, and
       determine a relationship of the input and output of the target job in at least one stage of a plurality of stages through analyzing the historical job, wherein the target job is to be processed in parallel in the at least one stage,
    wherein the relationship determining unit includes:
       an association determining unit configured to determine an association between input data and output data of the intermediate task of the target job based on an input data size and an output data size of the historical intermediate task;

a resource overhead calculating unit including a processor and configured to calculate a computing resource overhead prediction associated with the target job based on the relationship of input and output;

an alert generating unit configured to generate a proactive alert for the target job in response to the resource overhead prediction exceeding a predetermined threshold indicating an insufficiency of system parameters for performing the target job; and a processor configured to process the target job with adjusted system parameters to prevent exceeding a resource overhead.

11. The system according to claim 10, wherein the historical job is obtained based on a processed portion of input data of the target job.

12. The system according to claim 10, wherein the historical job has the same processing logic with the target job, and wherein the relationship determining unit further comprises:

a second association determining unit configured to determine a second association between input data and output data of the target job based on an input data size and an output data size of the historical job.

13. The system according to claim 12, wherein the resource overhead calculating unit comprises:

an input data obtaining unit configured to obtain an input data size of the target job; and a first output data determining unit configured to determine an output data size of the target job after the at least one stage based on the second association and the input data size of the target job.

14. The system according to claim 13, wherein the alert generating unit is configured to generate the alert for the target job in response to the output data size of the target job after the at least one stage exceeding a predetermined storage threshold for a corresponding memory.

15. The system according to claim 10, wherein the resource overhead calculating unit comprises:

an input data property obtaining unit configured to obtain a property of input data of the target job, the property of the input data including at least one of an input data size, data distribution, and a block size of the input data;

an intermediate input data determining unit configured to determine an input data size associated with the intermediate task of the target job based on the property of the input data; and an intermediate output data determining unit configured to determine an output data size of the intermediate task based on the second association and the input data size associated with the intermediate task.

16. The system according to claim 15, wherein the alert generating unit is configured to generate the alert for the target job in response to the output data size of the intermediate task exceeding a predetermined storage threshold for a corresponding memory.

17. The system according to claim 15, wherein the relationship determining unit further comprises a third association determining unit configured to determine a third association between the input data and an output record number of the intermediate task of the target job based on the input data size and an output record number of the historical intermediate task; and wherein the resource overhead calculating unit further comprises:

an output record determining unit configured to determine an output record number of the intermediate task based on the third association and the input data size associated with the intermediate task; and a read/write quantity determining unit configured to determine read/write quantity corresponding to storing of the output data of the intermediate task based on the output record number of the intermediate task and the output data size of the intermediate task.

18. The system according to claim 17, wherein the alert generating unit is configured to generate the alert for the target job in response to the read/write quantity exceeding a predetermined read/write threshold.

* * * * *